Figure 1A:
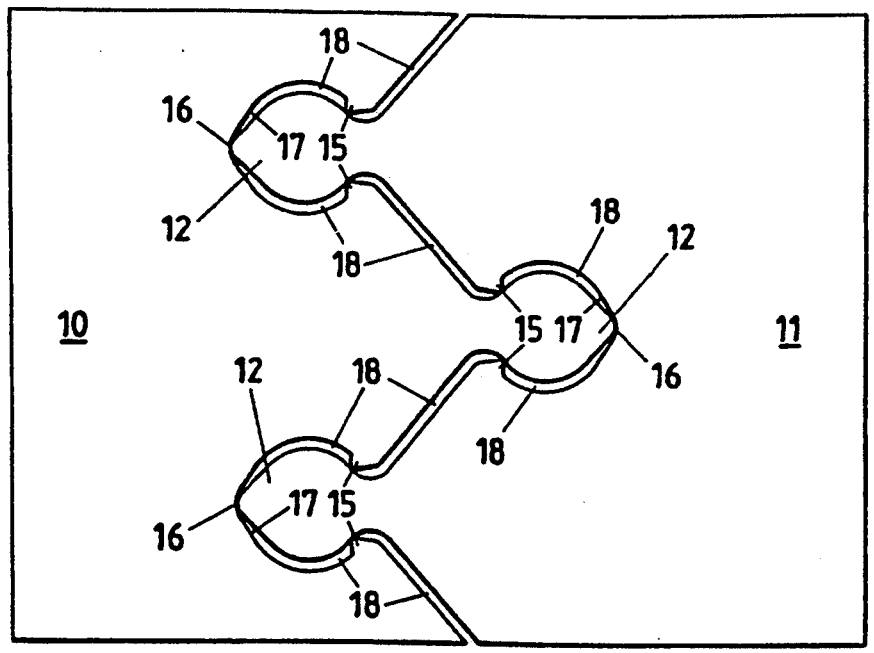
Figure 1B:
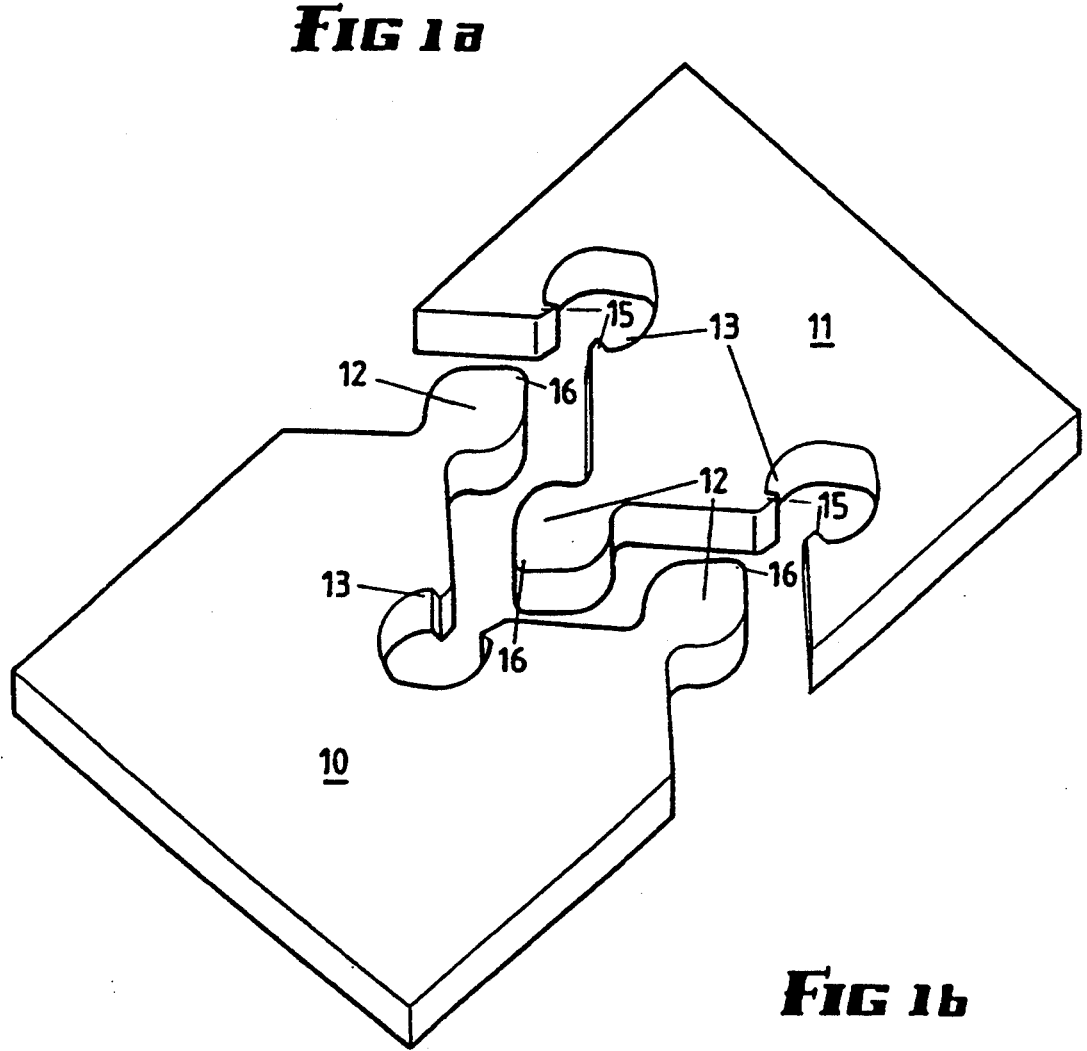

United States Patent [19]
Duncanson

[11] Patent Number: 5,357,728
[45] Date of Patent: Oct. 25, 1994

[54] JOINTING OF BUILDING PANELS AND SHEETS

[76] Inventor: Robert J. Duncanson, 161/2 Sukhumvit Road, Bangkok, Thailand

[21] Appl. No.: 768,880
[22] PCT Filed: May 2, 1990
[86] PCT No.: PCT/AU90/00171
  § 371 Date: Oct. 24, 1991
  § 102(e) Date: Oct. 24, 1991
[87] PCT Pub. No.: WO90/13402
  PCT Pub. Date: Nov. 15, 1990
[51] Int. Cl.⁵ .............................. E04B 1/38
[52] U.S. Cl. ....................... 52/592.4; 52/436;
  52/590.2; 52/590.3; 52/592.2; 403/381;
  403/382
[58] Field of Search .......... 52/590, 591, 284, 594,
  52/595, 272, 436; 403/364, 403, 382, 381, 231;
  217/12 R, 13, 65

[56] References Cited

U.S. PATENT DOCUMENTS

| | | | |
|---|---|---|---|
| 1,122,350 | 12/1914 | Wysong | 52/595 |
| 2,004,193 | 6/1935 | Cherry | 52/595 |
| 2,544,983 | 3/1951 | Davis | 52/436 |
| 2,691,242 | 10/1954 | Young | 52/591 |
| 3,422,588 | 1/1969 | Stewart, Jr. | 52/595 |
| 3,442,311 | 5/1969 | Rhyne . | |
| 3,499,254 | 3/1970 | Jefferys | 52/594 |
| 3,692,201 | 9/1972 | Garduna | 52/590 |
| 4,173,287 | 11/1979 | Kumakawa | 52/284 |

FOREIGN PATENT DOCUMENTS

| | | | |
|---|---|---|---|
| 697852 | 11/1964 | Canada | 52/593 |
| 201414 | 6/1907 | Fed. Rep. of Germany | 52/436 |

*Primary Examiner*—Michael Safavi
*Attorney, Agent, or Firm*—Klauber & Jackson

[57] ABSTRACT

An improved panel jointing system wherein panels (10,11) are provided with profiled edge portions comprising tongue formations (12) and recesses (13) which are of complementary shape to the tongues (12), the tongues (12) of one panel being receivable in the recesses (13) of another panel, wherein the profiled edge portions comprise integrally formed projections (15, 16) projecting from the edge surfaces of the tongues (12) and/or from the walls forming the recesses (13), the tongues (12), recesses (13) and projections (15, 16) being shaped and dimensioned so that when the tongues are received in the recesses, the tongues (12) form a friction fit with the recesses (13), and the opposed facing surfaces of the tongues (12) and the walls of the recesses (13) being spaced apart so as to form a gap (18) of approximately uniform width which extends along the joint between the panels, interrupted by the projections (15, 16), the gap being fillable with adhesive.

8 Claims, 7 Drawing Sheets

JOINTING OF BUILDING PANELS AND SHEETS

This invention relates to the jointing of panels or sheets, and is especially suited for the jointing of building panels or sheets made of timber, timber laminate (e.g. plywood), or particle board.

It is of course well known in carpentry to join together timber panels (including those formed of plywood and chipboard) by adhesively bonding together interlocking end portions of the panels so as to form the joint. Typical known joints between panels or planks include finger joints, tongue and groove joints, dowelled joints and dovetail joints. In the boat building industry, in particular the construction of the interior of a boat, it is important that the panel joints have a high degree of structural strength and the conventional jointing methods which have been used to achieve such strength have normally employed additional jointing elements, e.g. fastening cleats, to secure together the abutting edges of the building panels or sheets. However, such jointing methods have several disadvantages in that they are labour intensive and therefore of relatively high cost and in some cases are not able to produce a joint having a smooth surface finish.

It is an object of the present invention to provide an improved carpentry joint for joining together timber panels, sheets, planks or the like, which is simple, inexpensive and readily effected.

It is another object of the present invention to provide improved jointing between building panels or sheets which will allow a structure made up of the panels or sheets to be dry assembled and the panels subsequently adhesively bonded together whilst in an assembled condition.

It is a still further object of the present invention to provide improved jointing for building panels, sheets, planks and the like which enables the surfaces of the panels or sheets to be in a finished condition before their assembly and gluing together.

It is a still further object of the present invention to provide an improved building panel joint which will have high structural strength.

In the specification and accompanying claims, the term "timber" shall include solid timber, timber laminate, particle board and chip board, whilst the term "panel" shall include within its scope a sheet or plank.

According to one form of this invention therefore, there is provided improved means for joining together a pair of panels in edge to edge coplanar or angled relationship wherein the panels are provided with profiled edges comprising alternate tongue formations and recesses having a shape substantially complementary to said tongue formations, said tongue formations of one panel being receivable in the recesses of the other panel (and vice versa), wherein said profiled edges comprise integrally formed projections projecting from the edge surfaces of said tongue formations and/or from the walls forming said recesses, the tongue formations, recesses and projections being shaped and dimensioned such that said tongue formations form a friction fit with said recesses by virtue of the frictional engagement between said projections and either the edge surfaces of said tongue formations or the surfaces of said recess forming walls, the opposed facing surfaces of said tongue formations and said recess forming walls being spaced apart so as to form a gap of approximately consistent width which extends along the join between the panels, interrupted by said projections, said gap being fillable with adhesive.

Preferably the projections comprise nibs which, when formed on the tongue formations, project outwardly from the edge surfaces thereof and extend at right angles to the plane of the panel, or, if formed in the recesses, project outwardly from their walls, the depth of the nib corresponding approximately to the width of the gap formed between the tongued and recessed edges.

In a preferred embodiment of this invention, each of the profiled edge portions of the panels defines a "jigsaw" pattern comprising alternate tongue formations defined by curvilinear edge surfaces and complementary shaped recesses, each tongue formation having a head portion which merges with a neck portion of reduced width.

In another form of this invention, there is provided improved means for joining together a pair of panels in orthogonal relationship to form a T-joint, wherein one of said panels or sheets is provided with a plurality of aligned slotted openings in a wall surface thereof, each said slotted opening being defined by a pair of opposed end walls, a pair of opposed side walls, and chamfers respectively joining said end walls to said side walls, and wherein the other of said panels or sheets comprises a plurality of spaced apart tongue formations coplanar with said panel or sheet and projecting from an edge thereof, said tongue formations being spaced apart by a distance which approximately equals the spacing between adjacent said slotted openings, said tongue formations each being receivable in a respective said slotted opening, arranged and constructed so that with said tongue formations inserted in said slotted openings, the panels or sheets are frictionally retained together by virtue of the frictional engagement between the lateral edges of each tongue formation and the chamfer surfaces of a respective said slotted opening along respective mutual contact lines, with a gap being formed between the walls of said slotted opening and the surfaces of said tongue formation, said gap having a width which is approximately uniform and being fillable with adhesive.

In this instance, instead of nibs, the chamfers are formed in each of the slotted openings to effect the friction fit between the interlocking parts of the panels, as well as provide a consistent gap extending around each of the joints.

Preferably the adhesive injected into the gap or spacing between the interlocking profiled portions of the panels is an epoxy adhesive which is applied to the joints when the panels are in an assembled condition.

It will be appreciated that the joint of this invention, by its very nature, requires the tongue formations and the slots or recesses to be precisely machined and according to a preferred method of production, the tongue formations and the slots or recesses are formed by a water jet cutting operation which utilises a jet of water under pressure of approximately 90,000 psi jetted through a sapphire orifice (one known water jet cutter being manufactured by Ingersoll-Rand of U.S.A.). The cutting operation is computer controlled to ensure repetitive precision cutting. Of course, an N.C. router or laser cutter may also be used to produce the joints.

Figure 2A:
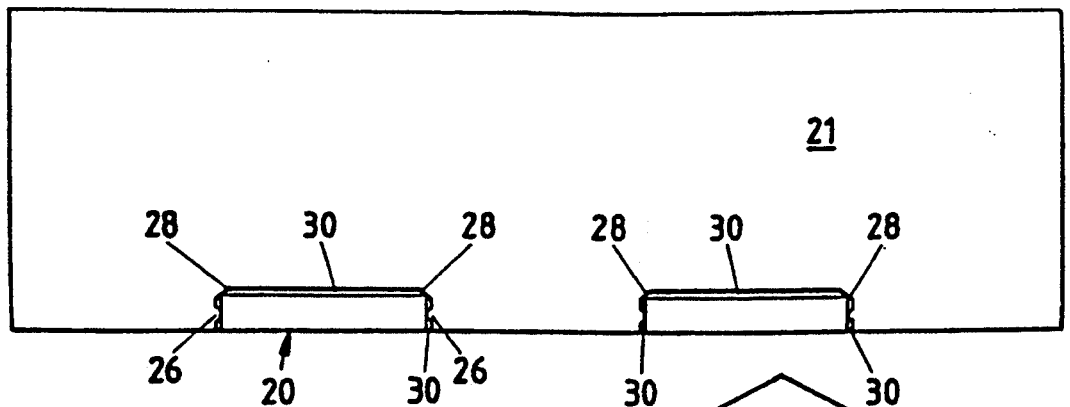
Figure 2B:
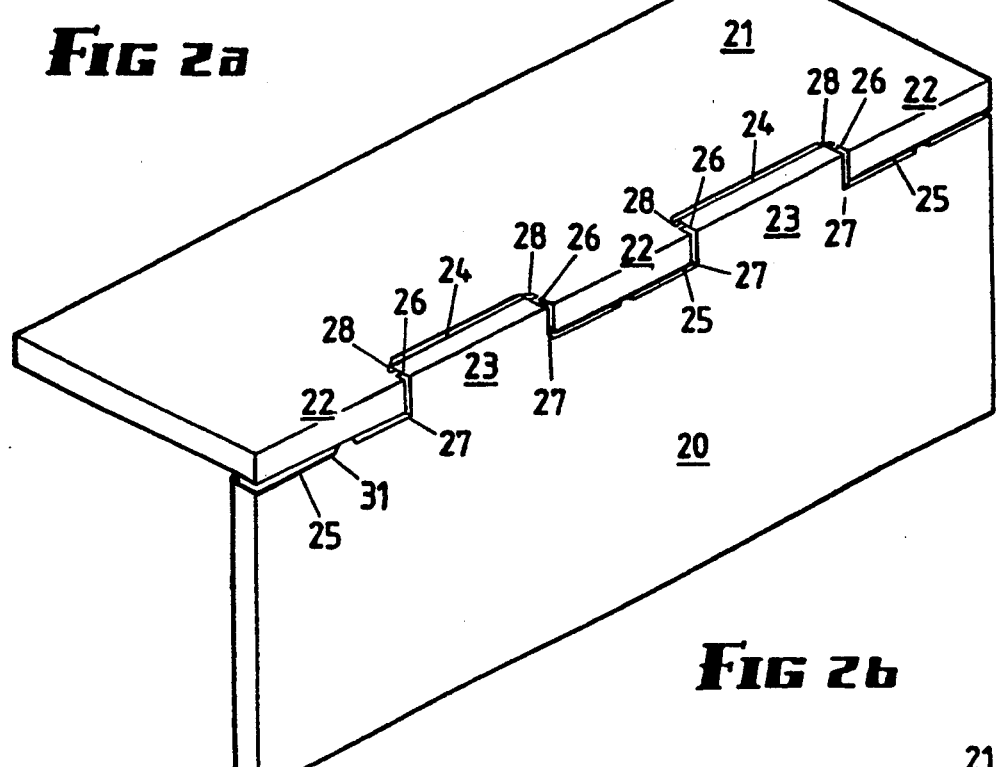
Figure 2C:
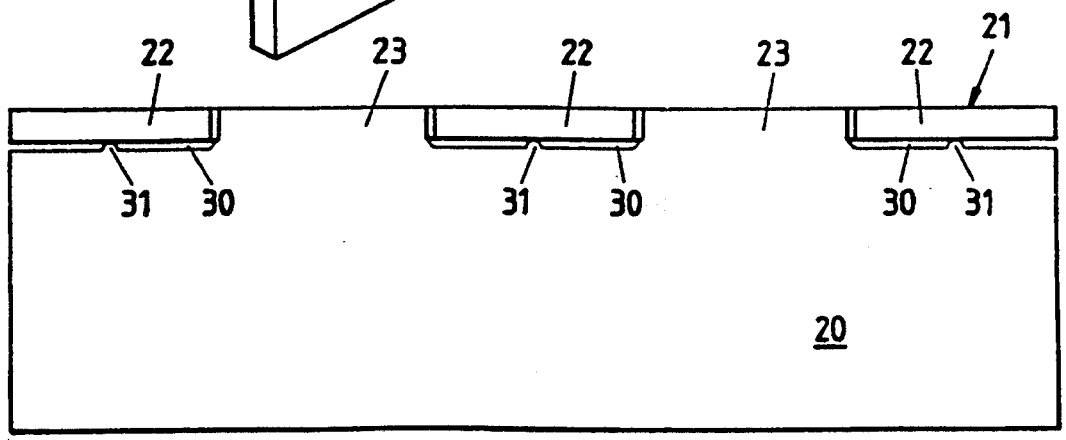
Figure 3A:
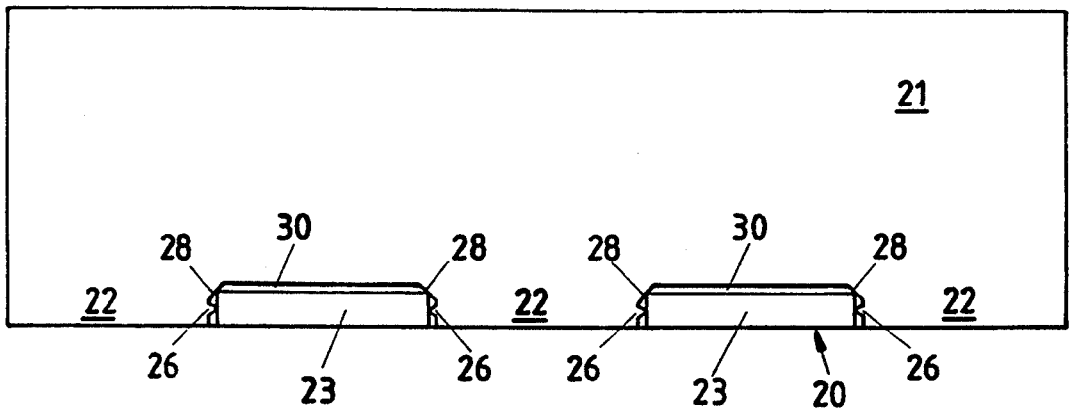
Figure 3B:
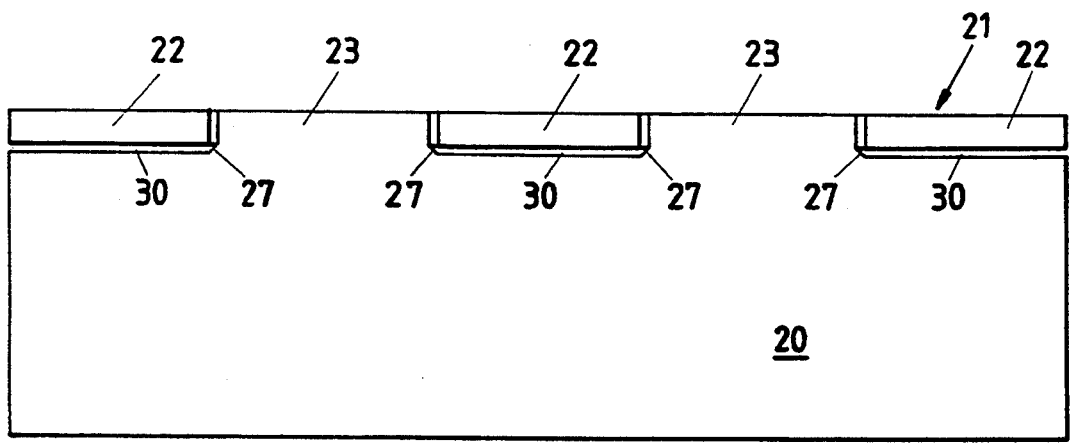
Figure 5:
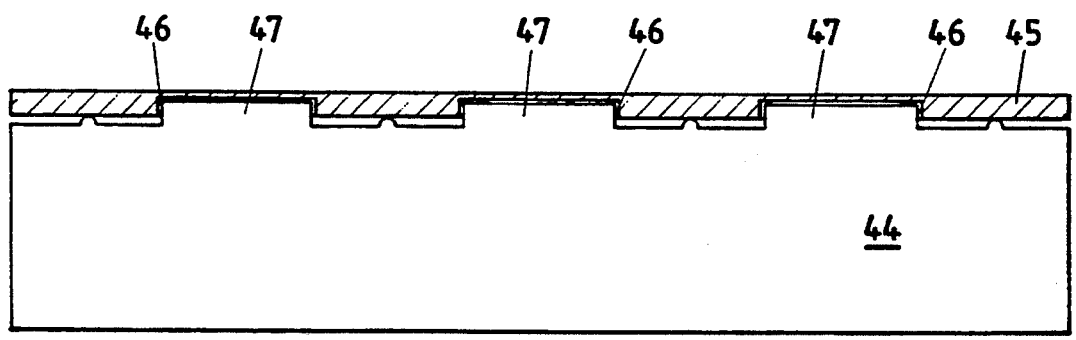
Figure 4A:
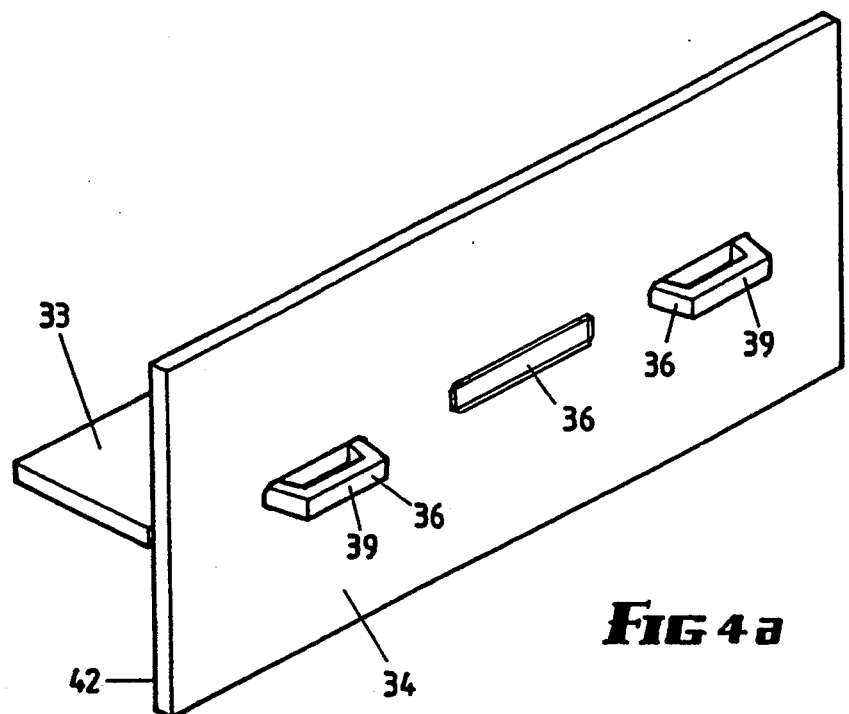
Figure 4B:
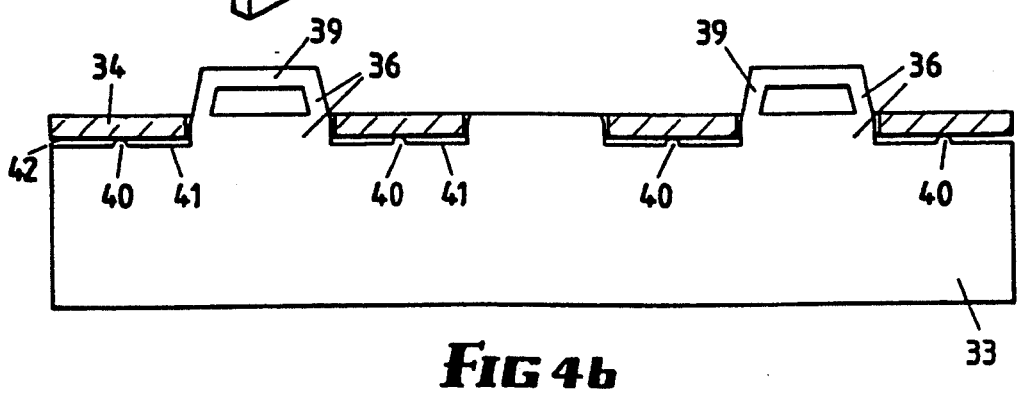
Figure 4C:
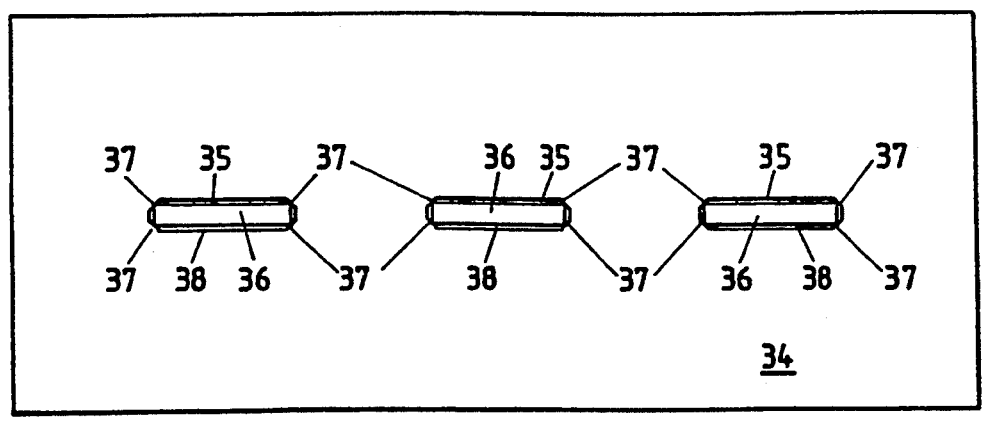
Figure 6A:
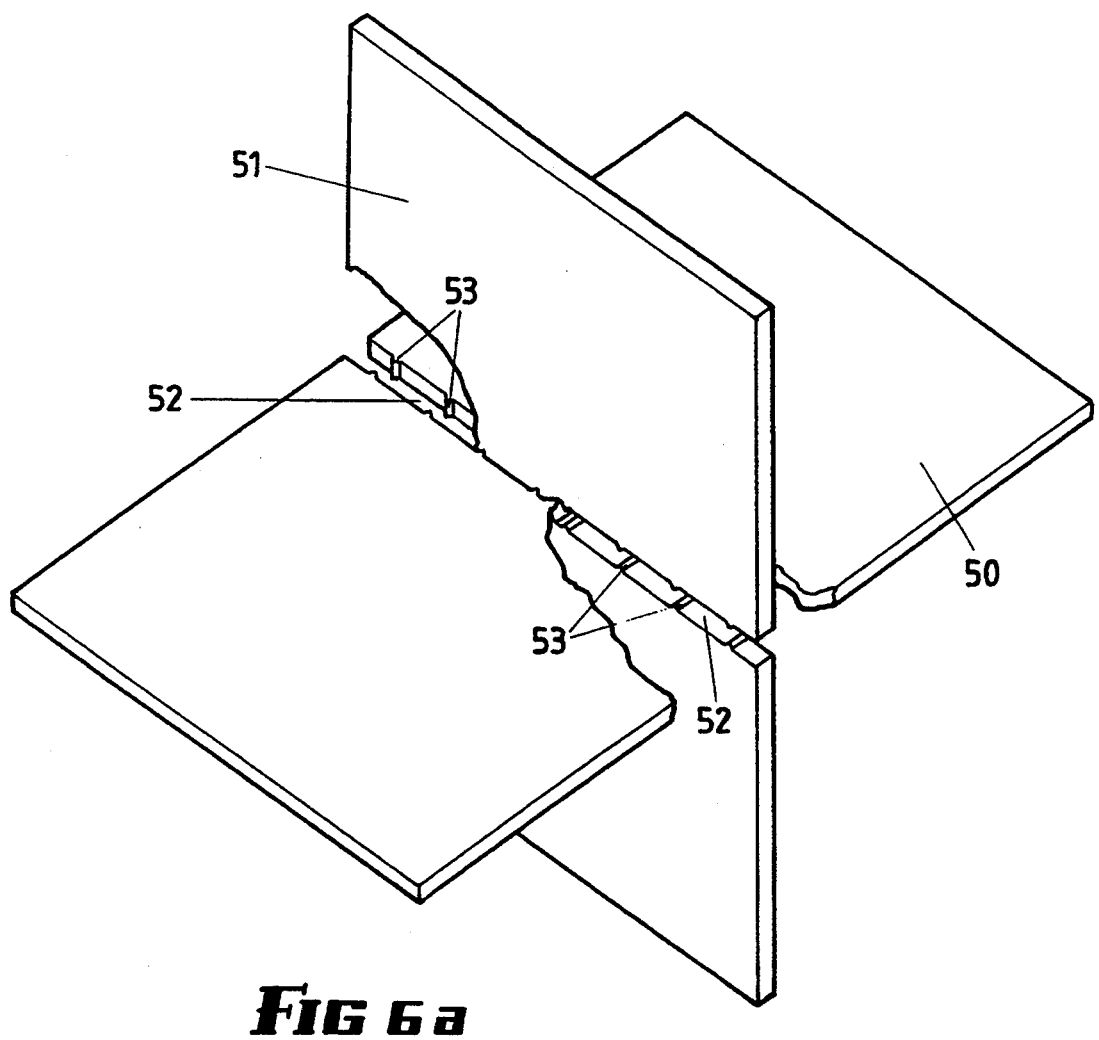
Figure 6B:
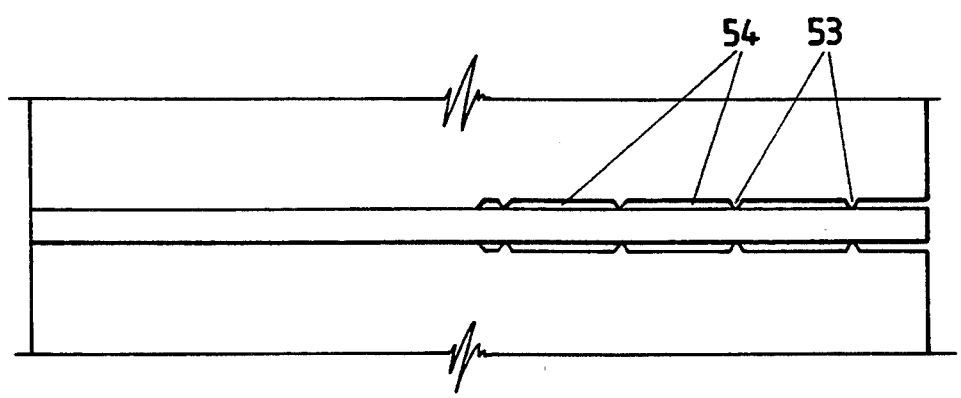
Figure 7A:
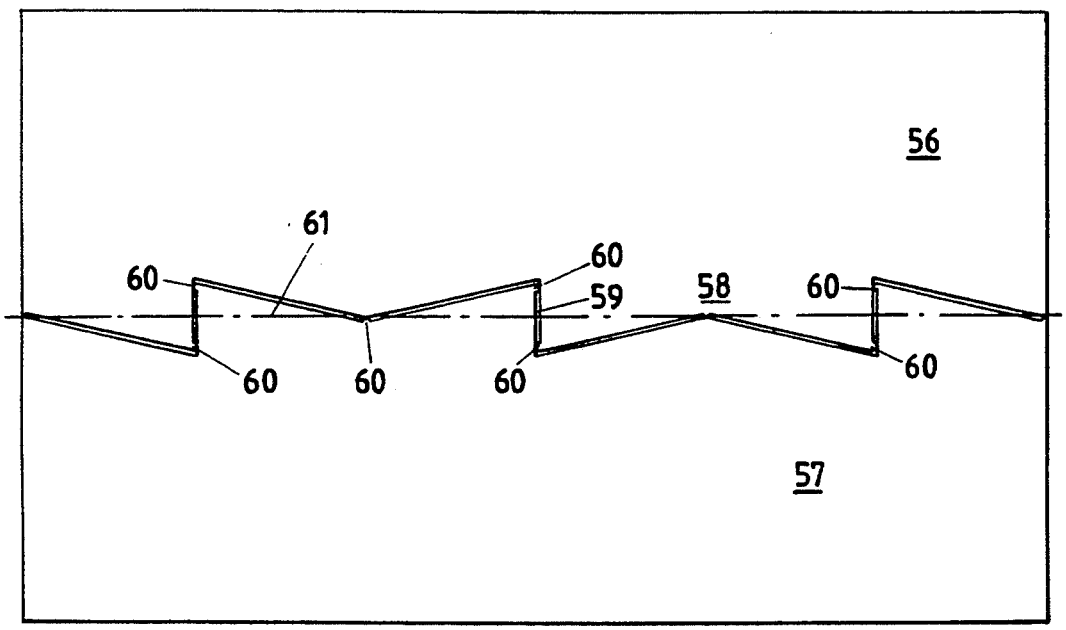
Figure 7B:
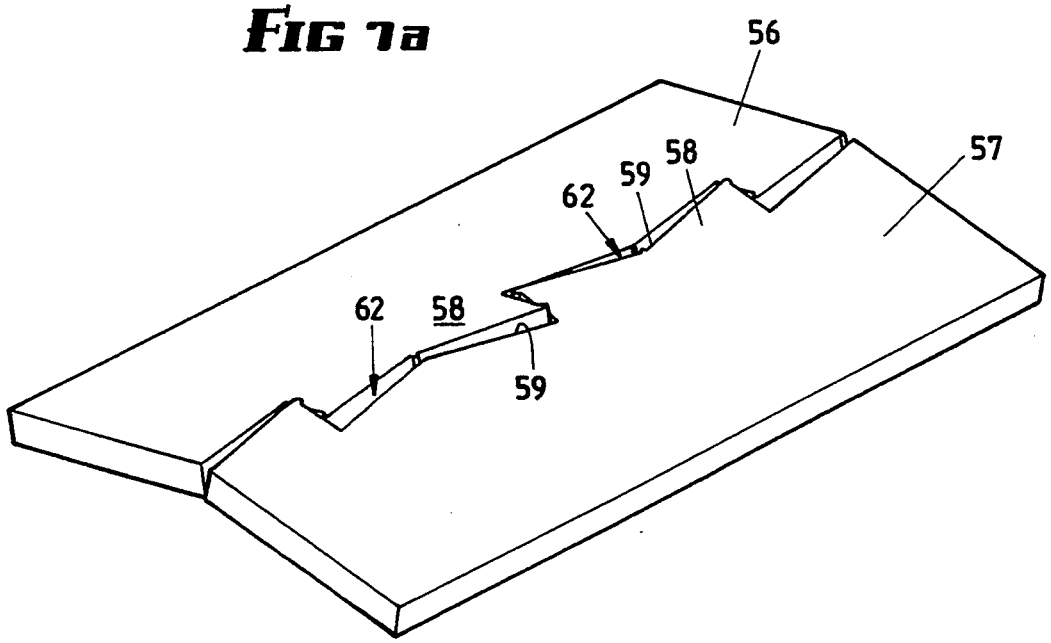
Figure 8:
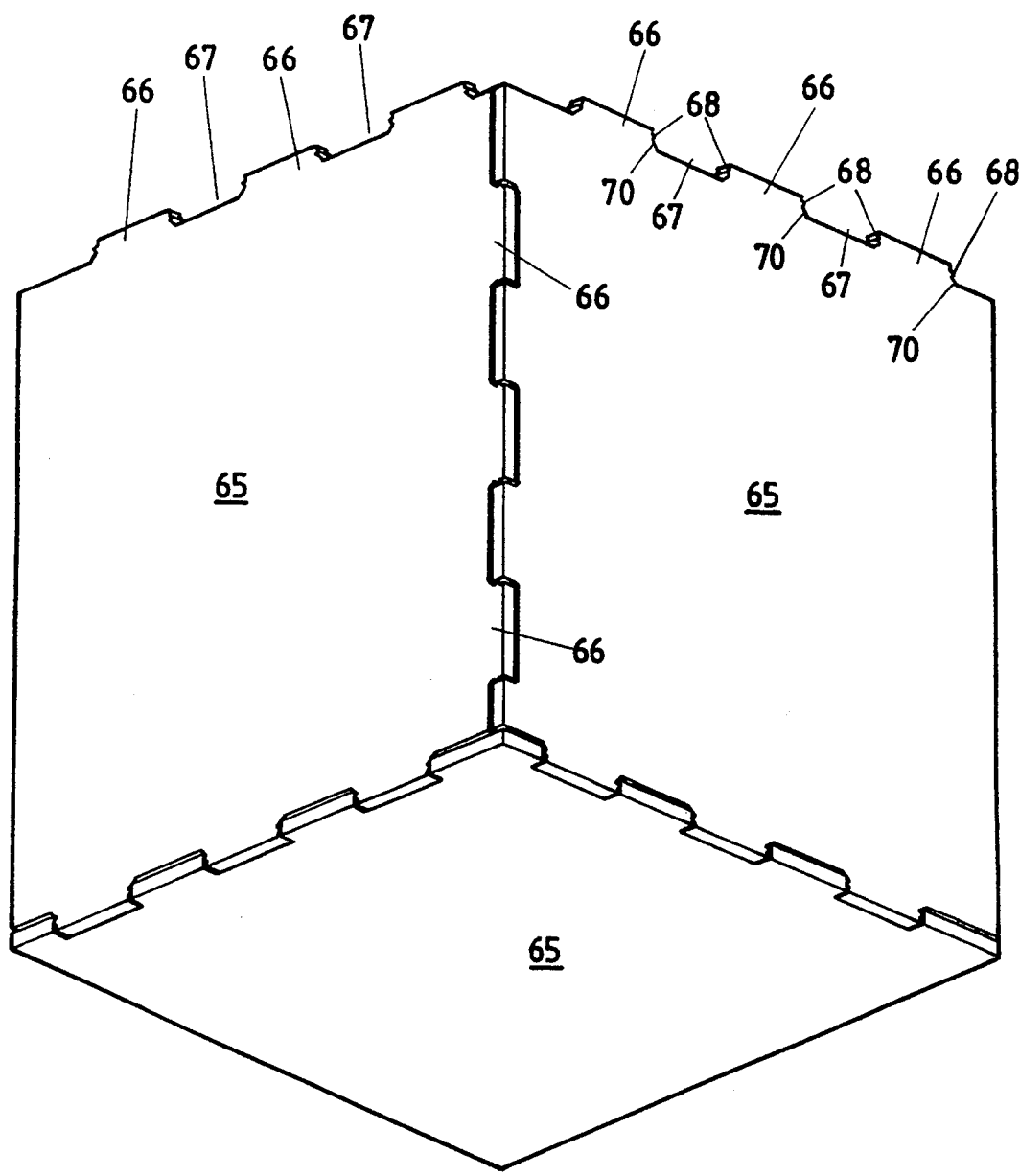

In order to more fully explain the present invention, several embodiments of the invention are described hereunder with reference to the accompanying drawings, in which:

FIGS. 1(a) and (b) are plan and "exploded" perspective views respectively of an end panel joint according to one embodiment of the invention;

FIGS. 2(a), (b) and (c) are views in plan, perspective and side elevation respectively of a corner panel joint according to a second embodiment;

FIGS. 3(a) and (b) are plan and side views of a corner panel joint similar to FIG. 2, but with pointed nibs, FIGS. 4(a), (b) and (c) are views of a T-panel joint according to a third embodiment, FIG. 5 is a partly sectioned view showing a T-joint similar to FIG. 4, but with "blind" slots, FIGS. 6(a) and (b) are views showing a lap joint between two panels according to a fourth embodiment, FIGS. 7(a) and (b) are views of an end panel joint especially suited for interlocking planks used for a multichine hull of a boat, and FIG. 8 is a perspective view of an assembly of panels joined together by corner joints as shown in FIG. 3 hereof.

In the embodiment illustrated in FIGS. 1(a) and (b), two panels 10, 11 and joined together in coplanar end to end relation with each of the panels 10, 11 having identical profiled edges which form complementary "jigsaw" elements. Each of the profiled edges comprises tongue elements 12 projecting in the plane of the panel which are receivable in complementary shaped recesses 13. In this embodiment the tongue elements 12 and recesses 13 are formed alternately along an edge of each of the panels 10, 11 to be joined.

To allow the panels 10, 11 to be assembled dry and retained together in a spatial arrangement when so assembled, each of the recesses 13 is provided with a pair of nibs 15 projecting into the interior of the recess 13 from opposed walls thereof, with the leading end of each tongue 12, being similarly provided with a nib or protrusion 16 projecting from its edge surface. The tongue elements 12 and recesses 13 are shaped and sized so that the tongue elements 12 engage with a friction fit in their corresponding recesses 13, by virtue of the frictional contact made between the nibs 15 and the edge surfaces of the corresponding tongue elements 12 between the nibs 16 on the tongues 12 and the recess forming walls 17, with a gap 18 of approximately uniform width being provided between the opposed facing surfaces of the tongue elements 12 and the walls 17 of the recesses 13, the gap 18 extending along the length of the joint, interrupted only by the nibs 15, 16. With this arrangement, the interlocking panels can be assembled dry and frictionally retained together, and an adhesive applied in the gap 18 after assembly of the structure.

It will of course be appreciated that instead of having a nib 16 on the leading end of the tongue element 12, a nib, similar to nibs 15, may be provided at the inner end of the recess 13 so as to make frictional contact with the leading end of the tongue element 12. The nibs 15, 16 extend the whole thickness of the panels 10, 11, and are at right angles thereto.

In the embodiment shown in FIGS. 2(a)-(c), two panels 20, 21 are shown joined together to form a corner joint, each panel 20, 21 having formed along an edge thereof a plurality of spaced apart projecting tongues 22, 23 respectively between which are formed recesses 24, 25. Rounded nibs 26 projecting from opposite side walls of the recesses 26 are provided on panel 21, the nibs 26 frictionally engaging edge surfaces of the tongues 23 on panel 20 when the panels are press-fitted together. Further frictional engagement is made between opposite inner edges of the tongues 22, 23 and chamfers 27, 28 respectively formed in the inner corner regions of recesses 24.

As shown in FIGS. 2(a) and (c) an adhesive receiving gap 30 is formed along the joint between the tongues 22, 23 and the walls of their respective recesses 24, 25, being interrupted only by the nibs 26 and chamfers 27, 28.

Nibs 31 spaced along the edge of panel 20 may be used to provide a gap between the base wall of each of the recesses 25 and the underside surface of a corresponding tongue 22, in lieu of chamfers 27.

As in the first embodiment, the panels 20, 21 are assembled dry, and thereafter adhesive is injected into the gap 30 which extends interruptedly along the length of the joint.

Referring to FIG. 3, this shows a corner joint almost identical to FIG. 2 (and uses the same item numbers for corresponding parts), wherein the nibs 26 have a pointed leading edge, whilst the nibs 31 have been omitted.

Referring to FIGS. 4(a), (b) and (c) of the drawings, panels 33, 34 are jointed together to form a T-joint, the edge surface of panel 33 being brought into contact with the wall surface of panel 34. Panel 34 is provided with an horizontal row of equally spaced slots 35 into which are inserted respective tongues 36 projecting from an edge of panel 33 and coplanar therewith. As with the previously described embodiments, the tongues 36 frictionally engage within the slots 35 whereby the panels 33, 34 can be retained together when assembled dry. In this embodiment the frictional contact between the tongues 36 and the slot forming walls is along mutual contact lines between the upper and lower side edges of the tongues 36 and chamfer surfaces 37 formed between the end and side walls of the slots 35 (refer FIG. 4(c)). The relative dimensions of the slots 35 and the tongues 36 are such that with the tongue inserted in its slot, a gap or spacing 38 is formed between the opposed facing surfaces of the tongue 36 and the walls of the slot 35.

In this embodiment, some of the tongues 36 are formed to have a loop portion 39 which is designed as a "breakaway" section so that when the tongues 36 are engaged in their slots 35 and the gaps 38 are filled with glue, the portion 39 can be "snapped off", e.g. by a hammer, so as to provide a flush joint. During assembly of the panels, wedges (not shown) can be inserted through the loop portions 39 in order to further stiffen the structure prior to the application of the glue. This eliminates any possibility of the panels separating during the dry assembly stage.

Nibs 40 are provided along the edge 41 of panel 33 alternately with the tongues 36 in order to provide an adhesive filling gap between panel edge 41 and the wall surface 42 of panel 34 along the interface thereof. In this way, after gluing, a layer of adhesive extends virtually continuously along the length of the join, interrupted only by the nibs 40 and the contact lines between the tongues 36 and chamfers 37. This results in a glued joint of very high strength.

Referring to FIG. 5, again a T-joint similar to that in FIG. 4, is shown, between panels 44, 45. However in this embodiment, the slots 46 formed in panel 45 are "blind", with the tongues 47 projecting into the slots and abutting against their end walls. Again, the corners of the slot 46 are chamfered to frictionally engage the upper and lower side edges of the tongue 47 when inserted thereinto, whilst forming a gap between the facing surfaces of the tongue and the slot forming walls.

Referring to FIGS. 6(a) and (b), there is shown a lap-joint between panels 50, 51, each panel 50, 51 being provided with an elongate slot 52 extending inwardly from an edge thereof and at right angles thereto, the panels being interlocked by sliding one slot 52 into the other. In this embodiment, each slot 52 has a length which approximates to half the width of the panel so that the panels, when joined, have their adjacent edge surfaces flush with one another.

Each slot 52 is provided with a plurality of spaced nibs 53 which project into the slot opening, the nibs 53 serving to frictionally retain the panels 50, 51 together when assembled. Again an adhesive receiving gap 54 is formed between the slot forming walls and the panel surfaces, which extends interruptedly along the join.

Referring to FIGS. 7(a) and (b), this shows a panel joint between two timber planks 56, 57 which is suitable for use in building multi-chine boat hulls, where adjacent planks are required to take up varying angles. The profiled edges of the planks 56, 57 include alternate tongues 58 and recesses 59 of complementary shape, and nibs 60 which serve to frictionally retain the tongues 58 when press-fitted into their recesses 59. The planks 56, 57 can pivot relative to one another about centre-line 61 to achieve the desired angle therebetween, following which adhesive is injected into the gap 62 which is formed along the join.

Referring to the embodiment of the invention illustrated in FIG. 8 of the drawings, there is shown a plurality of panels 65 (identical to panels 20, 21 shown in FIGS. 3(a) and (b)) joined together to form a corner joint, each panel 65 having formed along three edges thereof a plurality of projecting tabs 66 between which are formed recesses 67. In this embodiment each of the recesses 67 is provided with a pair of opposed nibs 68 projecting into the recess from opposite sides thereof. The nibs 68 provide a gap or spacing for receiving adhesive at each side of the tab 66. A further gap is provided between the bottom edge of the recess 67 and a facing surface of the tab 66 by means of chamfer surfaces 70 at each inner corner of the recess.

The tabs 66, when engaged within their recesses 67, are frictionally retained therein by virtue of the frictional contact made between the nibs 68 and the lateral edge surfaces of the tabs 66, and also between the chamfer surfaces 70 and the inner lateral edges of the tabs 66.

As described in the first embodiment, the panels 20 are assembled dry, and thereafter adhesive is injected into the adhesive receiving gap or spacing formed along the joints.

In each of the above-described embodiments, the panels are formed of plywood and are precision cut using a computer controlled water jet cutting operation.

Preferably the panels are adhesively bonded together using an epoxy glue which can be injected into the gaps formed within the joints. This can be done by means of a pressure gun or by hand using a putty knife.

With this invention, the timber panels can be pre-painted or pre-coated, e.g. with an epoxy resin, to seal the timber from moisture, and no finishing work on the panels after the gluing step is required. This is made possible by the extreme simplicity of the jointing procedure and the avoidance of the need to use any fastener elements or bracketry.

If a high degree of structural strength is required, an adhesive filler compatible with the glue may be used to form fillets along the corners where the panels abut one another, e.g. in a T-joint or corner joint connection.

It is a feature of the present invention that the panels may be assembled dry and subsequently dismantled in whole or in part (should that be necessary) prior to the filling of the joints with adhesive. A further feature is the provision of a consistent gap which extends along the joint and which may be filled with glue after the assembly of the panel structure.

The invention is especially suited for boat building joinery on account of the structural strength of the joints. Furthermore the invention enables the interior of a boat to be assembled with its bulkheads, and subsequently the hull and deck built around the assembled interior.

The invention is also suited for the production in kit form of building structures composed of timber (or timber substitute) panels which can be assembled together by the home handyman.

A consideration of the above-described embodiments will indicate that the invention provides for an extremely simple and economical joint for interconnecting panels, sheets, planks and the like and which enables timber panel structures to be quickly and easily assembled without the use of any separate fastening/securing elements. It is envisaged that the invention will be especially suited for the manufacture of home handyman furniture kits, e.g. dolls' houses, dog kennels, wardrobes, tables, and the like.

I claim:

1. Improved means for joining together a pair of panels, wherein each of said panels comprises means for nesting with the other of said panels with a complementary interfitting, with said interfitting comprising a frictional engagement between said panels at a plurality of sites and wherein a gap of approximately uniform width and an equidistant spacing between said panels, extends between said panels at the position of their complementary interfitting, said gap is interrupted by said plurality of sites, with said gap being filled with adhesive, wherein at least one of the pair of panels comprises a plurality of tongue formations and the other of the pair of panels comprises a plurality of recesses having a shape substantially complementary to said tongue formations, whereby said tongue formations of one panel are receivable in the recesses of the other panel, at least one of said complementary tongue formations and recesses comprises a plurality of integrally formed projections, with said projections being positioned, shaped, and dimensioned such that said tongue formation is frictionally fitted within said complementary recess by virtue of said projections between the tongue formation and the walls of the recess, and wherein opposed facing surfaces of said tongue formation and said walls of the recess are spaced apart so as to form a gap of approximately uniform width which extends between the tongue formation and the walls of the recess, interrupted by said projections.

2. Improved means for joining together a pair of panels according to claim 1 in edge to edge relationship wherein the panels are provided with profiled edge portions comprising alternate tongue formations having edge surfaces and recesses, with walls with surfaces, having a shape substantially complementary to said tongue formations, said tongue formations of one panel being receivable in the recesses of the other panel, wherein said profiled edge portions comprise integrally formed projections projecting from the edge surfaces of at least one of said tongue formations and the walls forming said complementary recesses, the tongue formations, recesses and projections being shaped and dimensioned such that said tongue formations form a friction fit with said recesses by virtue of the frictional engagement between said projections and at least one of the edge surfaces of said tongue formation and the surfaces of said recess forming walls, the opposed facing surfaces of said tongue formations and said recess forming walls being spaced apart so as to form a gap of approximately uniform width which extends along the join between the panels, interrupted by said projections, said gap being filled with adhesive.

3. Improved means according to claim 2 wherein the profiled edge portion of each said panel is of jigsaw configuration, with the tongue formations being defined by enlarged head portions engaging in complementary shaped recesses having complementary neck portions of reduced width.

4. Improved means according to claim 2 wherein the profiled edge portion of each said panel is of rectangular wave form, with the tongue formations defined by rectangular shaped tongues alternating with complementary shaped recesses.

5. Improved means according to any one of claims 2 to 4 wherein said panels each comprise opposing parallel planar surfaces with the panel thickness therebetween and wherein said projections are constituted by nibs which extend the whole thickness of the panel and are at right angles to the planar surfaces thereof.

6. Improved means according to claim 5 wherein said nibs have a rounded leading edge surface.

7. Improved means according to claim 5 wherein said nibs have a pointed leading edge.

8. Improved means according to claim 4 wherein the two inner corner regions of each said recess are chamfered, the corresponding lateral edges of said tongues frictionally engaging said chamfer surfaces, whereby a gap is formed between the base wall of the recess and the tongue.

* * * * *